(12) United States Patent
Wilson et al.

(10) Patent No.: US 12,075,018 B2
(45) Date of Patent: Aug. 27, 2024

(54) DISTRIBUTED VIRTUAL REALITY

(71) Applicant: Microsoft Technology Licensing, LLC, Redmond, WA (US)

(72) Inventors: Andrew D. Wilson, Seattle, WA (US); Balasaravanan Thoravi Kumaravel, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 17/236,935

(22) Filed: Apr. 21, 2021

(65) Prior Publication Data
US 2022/0345678 A1    Oct. 27, 2022

(51) Int. Cl.
| | | |
|---|---|---|
| *H04N 13/117* | (2018.01) | |
| *G06T 15/20* | (2011.01) | |
| *G06T 17/20* | (2006.01) | |
| *H04N 13/00* | (2018.01) | |
| *H04N 13/15* | (2018.01) | |
| *H04N 13/178* | (2018.01) | |

(52) U.S. Cl.
CPC .......... *H04N 13/117* (2018.05); *G06T 15/20* (2013.01); *G06T 17/20* (2013.01); *H04N 13/15* (2018.05); *H04N 13/178* (2018.05); *H04N 2013/0077* (2013.01); *H04N 2013/0081* (2013.01)

(58) Field of Classification Search
CPC .... H04N 13/117; H04N 13/15; H04N 13/178; H04N 2013/0077; H04N 2013/0081; H04N 21/21805; H04N 21/6587; H04N 21/816; G06T 15/20; G06T 17/20; G06T 19/003; G06T 2219/024; G02B 2027/014

USPC .......................................................... 348/51
See application file for complete search history.

(56) References Cited

U.S. PATENT DOCUMENTS

| | | | |
|---|---|---|---|
| 9,259,641 B2 * | 2/2016 | Gillo | A63F 13/00 |
| 9,616,338 B1 | 4/2017 | Hooper et al. | |
| 9,717,982 B2 | 8/2017 | Quinn et al. | |
| 10,733,783 B2 * | 8/2020 | Vlachos | G06T 15/205 |
| 10,867,432 B2 * | 12/2020 | Lodato | G06T 17/00 |

(Continued)

OTHER PUBLICATIONS

Dinc, et al., "Depth-color image registration for 3D surface texture construction using kinect camera system", In Proceedings of IEEE Southeastcon Conference, Mar. 13, 2014, 6 Pages.

(Continued)

*Primary Examiner* — Christopher S Kelley
*Assistant Examiner* — Ana Picon-Feliciano

(57) ABSTRACT

Aspects of the present disclosure relate to distributed virtual reality. In examples, a depth buffer and a color buffer are generated at a presenter device as part of rendering a virtual environment. The virtual environment may be perceived by a user in three dimensions (3D), for example via a virtual reality (VR) headset. Virtual environment information comprising the depth buffer and the color buffer may be transmitted to a viewer device, where it is used to render the virtual environment for display to a viewer. For example, the viewer may similarly view the virtual environment in 3D via a VR headset. A viewer perspective (e.g., from which the virtual environment is generated for the viewer) may differ from a presenter perspective and may be manipulated by the viewer, thereby decoupling the viewer's perception of the virtual environment from that of the presenter.

20 Claims, 10 Drawing Sheets

(56) References Cited

U.S. PATENT DOCUMENTS

| | | | |
|---|---|---|---|
| 2011/0221865 A1* | 9/2011 | Hyndman | H04N 19/85 |
| | | | 348/E13.001 |
| 2016/0238852 A1 | 8/2016 | Ellsworth et al. | |
| 2018/0275410 A1* | 9/2018 | Yeoh | H04N 13/398 |
| 2019/0259198 A1* | 8/2019 | Duca | G06F 3/14 |
| 2019/0358541 A1 | 11/2019 | Bronder et al. | |
| 2019/0371060 A1* | 12/2019 | Energin | G06T 19/003 |
| 2020/0066026 A1* | 2/2020 | Du | G06T 15/04 |
| 2020/0286278 A1* | 9/2020 | Gervasio | H04N 21/8146 |
| 2021/0178266 A1* | 6/2021 | Swann | A63F 13/86 |

OTHER PUBLICATIONS

Ferrone, Harrison, "Recommended settings for Unity", Retrieved from: https://docs.microsoft.com/en-us/windows/mixed-reality/develop/unity/recommended-settings-for-unity, Jul. 29, 2020, 8 Pages.

Mark, et al., "Post-Rendering 3d Warping", In Proceedings of Symposium on Interactive 3D Graphics, Apr. 27, 1997, pp. 7-16.

Pajarola, et al., "Depth-Mesh Objects: Fast Depth-Image Meshing and Warping", In UCI-ICS Technical Report No. 03-02, Feb. 1, 2003, pp. 1-11.

"International Search Report and Written Opinion Issued in PCT Application No. PCT/US22/023189", Mailed Date: Jul. 15, 2022, 14 Pages.

Takahashi, Dean, "Vreal can teleport you into a VR game so you can be a spectator", Retrieved from: https://venturebeat.com/2016/04/27/vreal-can-teleport-you-into-a-vr-game-so-you-can-be-a-spectator/, Apr. 27, 2016, 8 Pages.

Wong, et al., "Optimizing the User Experience of VR Games on IA for e-Sports", Retrieved from: https://software.intel.com/content/www/us/en/develop/articles/optimizing-the-user-experience-of-vr-games-on-ia-for-e-sports.html, Apr. 2, 2018, 9 Pages.

\* cited by examiner

DISTRIBUTED VIRTUAL REALITY

BACKGROUND

Virtual reality may provide a user with an immersive experience in a virtual environment. However, sharing the immersive experience with another user is challenging. For example, providing the viewer with the same perspective into the virtual environment may be limited by computational resource constraints, such as bandwidth and/or processing constraints. Further, the viewer may experience motion sickness (e.g., due to reduced visual fidelity or lack of control over the perspective).

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to distributed virtual reality. In examples, a depth buffer and a color buffer are generated at a presenter device as part of rendering a virtual environment. The virtual environment may be perceived by a user in three dimensions (3D), for example via a virtual reality (VR) headset. Virtual environment information comprising the depth buffer and the color buffer may be transmitted to a viewer device, where it is used to render the virtual environment for display to a viewer. For example, the depth buffer and color buffer may be used to generate a mesh and render the virtual environment at the viewer device accordingly. The viewer may similarly view the virtual environment in 3D via a VR headset. A viewer perspective (e.g., from which the virtual environment is generated for the viewer) may differ from a presenter perspective and may be manipulated by the viewer, thereby decoupling the viewer's perception of the virtual environment from that of the presenter.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
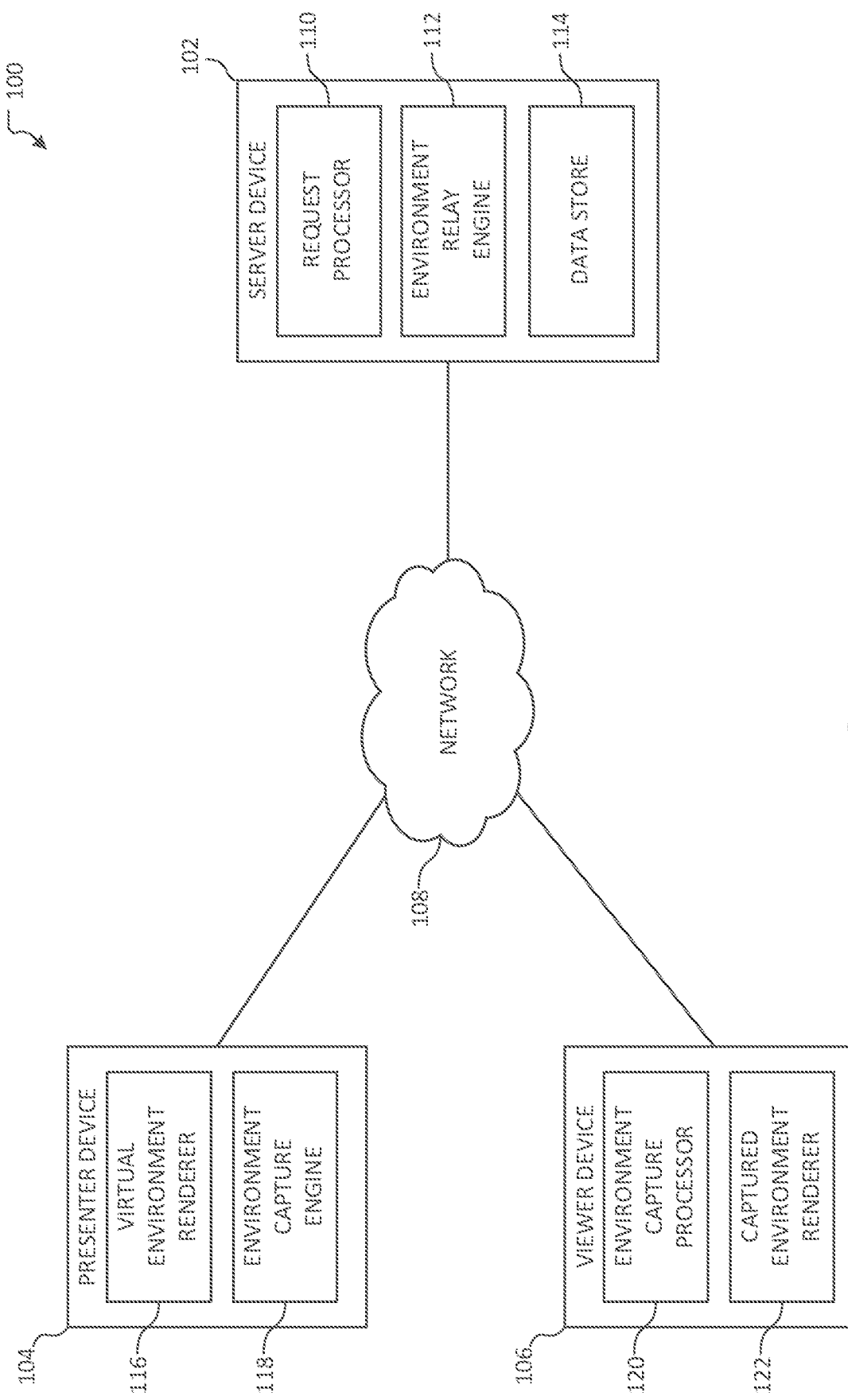
FIG. 1A illustrates an overview of an example system for providing distributed virtual reality according to aspects of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a user perceives a virtual environment from a perspective that may be controlled by the user. For example, a virtual reality (VR) headset may present a rendering of the virtual environment for each eye of the user or, as another example, a stereo display may be used, such that the virtual environment is perceived by the user in three dimensions (3D). However, enabling another user to spectate or otherwise view the virtual environment may be difficult. For example, providing the same set of renderings to a viewer (e.g., as a video feed for each of the viewer's eyes) may cause the viewer to develop motion sickness, as the viewer is not in control. Further, such techniques may be technically challenging or infeasible, as a result of associated data processing and/or bandwidth requirements (e.g., using a sufficient framerate and/or bitrate to reduce the likelihood of motion sickness).

As another example, rendering a separate perspective for the viewer may introduce additional barriers, such as computational requirements (e.g., graphics processing capabilities and/or available storage of the viewer's computing device) and licensing requirements (e.g., the viewer may need a license to execute software associated with the virtual environment). As a result, providing a 3D perception of a virtual environment to a viewer may be difficult for at least the foregoing reasons, such that a two-dimensional (2D) representation may be provided to the viewer instead.

Accordingly, aspects of the present disclosure relate to distributed virtual reality. In examples, a depth buffer (e.g., a z-buffer or a w-buffer) may be generated as part of rendering the virtual environment for presentation to a user. For example, the depth buffer may be processed to generate a vertex buffer, which may be textured according to an associated color buffer and presented to the user by a presenting computing device accordingly. The user may be referred to herein as a presenter, where the virtual environment associated with the presenting computing device is distributed to a set of viewers according to the distributed VR techniques described herein. For example, the depth buffer and color buffer (which may form at least a part of "virtual environment information") may be transmitted to a viewer computing device, such that the viewer computing device may generate a rendering of the virtual environment for the viewer. For example, a mesh may be generated based on the depth buffer, which may be rendered according to a perspective of the viewer (rather than that of the presenter). The mesh may be textured according to the color buffer. The virtual environment may be rendered for each eye of the viewer, such that the viewer may similarly perceive the virtual environment in 3D rather than 2D.

Aspects of the present disclosure may be utilized for any of a variety of virtual environments. For example, the virtual environment may be a video game that is presented to a player of the video game. As another example, the virtual environment may be a virtual collaboration environment, in which the presenter and one or more viewers are collaborators. Similarly, renderings of the virtual environment need not be restricted to VR, but may similarly be presented as an overlay to the physical environment of the user and/or as an augmented reality (AR) or mixed reality (MR) experience, among other examples.

As a result of the described techniques, the viewer need not be bound to the perspective of the presenter, as may be the case when a pre-rendered perspective, such as a video stream, is provided. Rather, the viewer may change a viewer perspective within the virtual environment, such that the virtual environment may be generated using the depth buffer and color buffer according to the viewer perspective rather than the presenter perspective. In examples, the viewer perspective may be at least loosely tethered to the presenter perspective, such that the perspective of the viewer moves in relation to the presenter perspective or, as another example, the viewer perspective may be permitted to deviate from the presenter perspective within a predetermined threshold. Such loose coupling between the presenter perspective and a viewer perspective may decrease the likelihood of motion sickness for the viewer, as the viewer has control over the perspective associated with the perceived rendering.

Further, updated virtual environment information (e.g., comprising an updated depth buffer and/or color buffer) may be transmitted at a reduced frequency as compared to the refresh rate of the rendering that is generated for presentation to the viewer. For example, updates may be received 30 times a second, while the virtual environment may be rendered at 90 frames per second. This may reduce computational requirements associated with transmitting virtual environment information to a set of viewers, while retaining a similar user experience to that which would be provided to a viewer if the viewer were perceiving the virtual environment first-hand (e.g., as if the viewer were the presenter). In some instances, at least a part of the virtual environment information may be compressed. As another example, delta encoding techniques may be used, where, for example, depth buffer and/or color buffer changes are identified and transmitted in addition to periodic full representations of the depth buffer and/or color buffer.

As a result of utilizing the depth buffer to render the virtual environment for the viewer, visual artifacts may be introduced. For example, if the viewer perspective is substantially similar to the presenter perspective, the generated mesh may yield a rendering that is similar to that which is rendered at the presenter computing device. However, as the viewer perspective deviates from the presenter perspective by a greater degree, the depth buffer received from the presenter computing device may not include data that is usable to render the virtual environment for at least a part of the viewer perspective. As an example, this may be the case if the viewer is looking a different direction than the presenter. As a further example, at least a part of the geometry in the virtual environment may not be included in the depth buffer in instances where the viewer is at a different location within the virtual environment than the presenter.

In some instances, the presenter computing device may generate additional virtual environment information than is used to render the virtual environment for the presenter. For example, depth buffer information may be generated periodically for a 360-degree field of view from the location of the presenter, such that depth buffer information is available in instances where viewers look different directions. As another example, a viewer computing device may retain at least a part of a generated mesh while updating other parts of the mesh using updated virtual environment information, such that the mesh is updated according to the presenter's perspective. This may yield a more complete representation of the virtual environment at the viewer computing device, though at least a part of the virtual environment may be stale as compared to the virtual environment of the presenter computing device at a given time. In some instances, simultaneous localization and motion (SLAM) techniques may be applied to generate a mesh with reduced visual artifacts resulting from differences between the presenter perspective and a viewer perspective. Thus, it will be appreciated that any of a variety of techniques may be used to address such visual artifacts or, as another example, such artifacts may not be addressed.

It will be appreciated that any of a variety of additional or alternative virtual environment information may be used to provide distributed virtual reality according to aspects described herein. For example, an identifier associated with the virtual environment may be provided, such as a video game name, map, and/or game type. In some instances, the identifier may be used to determine configuration information associated with the virtual environment, such as scaling information associated with the depth buffer. For example, different virtual environments may have different associated scaling information, such that a depth buffer value for a first virtual environment may be indicative of a different scale as compared to the same or a similar depth buffer value for a second virtual environment. In other examples, such scaling information may be determined programmatically, for example based on movement identified within a depth buffer and/or color buffer according to aspects described herein.

As another example, the virtual environment information may further comprise a projection matrix and/or view matrix associated with the depth buffer of the presenter computing device, such that the depth buffer may be processed according to the projection matrix and/or view matrix to generate a mesh that is re-projected at the viewer computing device (e.g., based on a projection matrix associated with a VR headset of the viewer computing device). As a further example, the virtual environment information may comprise additional information associated with the virtual environment, such as audio, a chat feed, and/or a player activity feed. As a result, audio may be played, and, as another example, the chat feed and/or player activity feed may be rendered at the viewer computing device (e.g., according to configuration information associated with the virtual environment). In some instances, the presenter may be rendered within the virtual environment, for example according to an indication of the presenter perspective and a mesh and/or texture associated with a presenter avatar. Thus, it will be appreciated that such environment information may be provided once, periodically, or according to any of a variety of events, among other examples, such that all types of environment information need not be provided with each update.

In some instances, a viewer computing device may receive virtual environment information associated with multiple virtual environments, such that a composite virtual environment may be generated comprising a mesh associated with each of the virtual environments. For example, a composite virtual environment may include a first virtual environment and a second environment generated according to aspects described herein. A viewer perspective may be associated with one of the virtual environments, thereby enabling the viewer to view the associated virtual environment as described above. User input may be received to view a different virtual environment (e.g., to cycle between constituent virtual environments of the composite virtual environment), such that the viewer perspective may be teleported to another constituent virtual environment. For example, the viewer perspective may be teleported to the player perspective of the constituent virtual environment, or may be teleported to a previous viewer perspective of the constituent virtual environment. In other instances, multiple environments may be presented in conjunction (e.g., side-by-side or one on top of the other), such that the user may view two or more virtual environments simultaneously. In such instances, each environment may be presented based on a stabilized player perspective or the user may toggle between controlling environments. Thus, virtual environment information may be received for multiple virtual environments, such that at least one virtual environment is generated and presented to a viewer accordingly.

While examples are described in the context of a presenter, an associated presenter computing device, and one or more viewers having associated viewer computing devices, it will be appreciated that similar techniques may be applied in instances where a presenter is remote from a presenting computing device. For example, a server computing device may receive user input to control a presenter perspective (e.g., from a presenter computing device) and may generate virtual environment information for the presenter accordingly. The server computing device may transmit virtual environment information to the presenter computing device, such that the presenter computing device may render the virtual environment accordingly. In some instances, the presenter computing device may render the virtual environment according to aspects described herein, thereby providing a 3D rendering of the virtual environment for the presenter. The virtual environment information may comprise information for each eye or the virtual environment may be rendered for both eyes based on virtual environment information for only one eye. Such techniques may be used in a cloud computing environment, as may be the case when the virtual environment is rendered remote from the presenter computing device. Further, the virtual environment may be presented to a set of viewers according to aspects described herein in some examples. In other examples, the virtual environment need not be presented to the set of viewers (e.g., such that only the presenter perceives the virtual environment of the server computing device).

Further, it will be appreciated that aspects of the present disclosure need not be limited to real-time or substantially contemporaneous viewing of a virtual environment. For example, virtual environment information may be stored for subsequent "playback" (e.g., by a presenter computing device, a server computing device, and/or a viewer computing device), in which the stored virtual environment is processed according to aspects described herein to enable perception of the virtual environment at a later point in time.

FIG. 1A illustrates an overview of an example system 100 for providing distributed virtual reality according to aspects of the present disclosure. As illustrated, system 100 comprises server device 102, presenter device 104, viewer device 106, and network 108. In examples, server device 102, presenter device 104, and viewer device 106 communicate using network 108, which may comprise a local area network, a wireless network, or the Internet, or any combination thereof, among other examples.

Server device 102 may be any of a variety of computing devices or, in other examples, server device 102 may be comprised of multiple computing devices. As illustrated, server device 102 comprises request processor 110, environment relay engine 112, and data store 114. In examples, request processor 110 receives a request for available virtual environments that may be viewed, as may be received from a computing device, such as viewer device 106. Accordingly, request processor 110 may generate a list of available virtual environments based on information from data store 114. For example, request processor 110 may have received an indication from presenter device 104 that a virtual environment associated with virtual environment renderer 116 is available for viewing, such that an associated entry may have been generated in data store 114. As a result, environment relay engine 112 may receive virtual environment information from presenter device 104, which may be relayed to viewer device 106, such that viewer device may process the virtual environment information and present a rendered virtual environment to a user of viewer device 106 accordingly.

Presenter device 104 may be any of a variety of computing devices. For example, presenter device 104 may be a mobile computing device, a desktop computing device, a laptop computing device, or a tablet computing device. Presenter device 104 may communicate with an associated VR headset (e.g., using a wired and/or wireless connection) to provide a rendering of a virtual environment generated by virtual environment renderer 116. In some instances, presenter device 104 may further receive user input from the VR headset or other associated peripheral devices. In other examples, presenter device 104 may itself be a VR headset. Presenter device 104 is illustrated as comprising virtual environment renderer 116 and environment capture engine 118. In examples, virtual environment renderer 116 is any of a variety of applications that generate a virtual environment, including, but not limited to, a video game or a 3D collaboration application. Accordingly, a user of presenter device 104 may provide user input to virtual environment renderer 116 to interact with the virtual environment generated by virtual environment renderer 116.

As discussed above, virtual environment renderer 116 may generate a depth buffer as part of generating the virtual environment for the user of presenter device 104. Accordingly, environment capture engine 118 may capture or otherwise obtain the depth buffer associated with virtual environment renderer 116. For example, environment capture engine 118 may access the depth buffer and copy data therein. As another example, environment capture engine 118 may receive the depth buffer from or may provide a request for the depth buffer to virtual environment renderer 116, a graphics library of presenter device 104, or a driver or kernel module associated with graphics processing hardware of presenter device 104, among other examples. Thus, it will be appreciated that any of a variety of techniques may be used to obtain a depth buffer associated with virtual environment renderer 116.

Environment capture engine 118 may use similar techniques to obtain any of a variety of other virtual environment information. For example, environment capture engine 118 may comprise an application programming interface (API) via which virtual environment renderer 116 may provide additional information associated with the virtual environment to environment capture engine 118, such as audio, a chat feed, and/or a player activity feed. As another example, environment capture engine 118 may capture at least a part of a display or other graphical output of presenter device 104 or, as a further example, may capture audio output of presenter device 104.

In some instances, environment capture engine 118 may determine a projection matrix associated with virtual environment renderer 116. For example, the projection matrix may be obtained from virtual environment renderer 116 or may be determined based on characteristics of a VR headset, among other examples. As another example, environment capture engine 118 determines a view matrix associated with virtual environment renderer 116. For example, the view matrix may comprise a position and orientation of the presenter perspective within the virtual environment.

Accordingly, environment capture engine 118 obtains virtual environment information associated with virtual environment renderer 116 and provides the virtual environment information to server device 102 (e.g., such that it may be relayed to viewer device 106 by environment relay engine 112). In some instances, environment capture engine 118 may compress at least a part of the virtual environment information or may be perform any of a variety of other processing. For example, environment capture engine 118 may process a depth buffer and/or color buffer to identify and encode differences from previous virtual environment information that was sent to server device 102, such that at least a part of the same or similar data that was previously transmitted to server device 102 is omitted from a subsequent transmission. In other instances, environment relay engine 112 may perform such processing, such that virtual environment information that is relayed by environment relay engine 112 may be compressed and/or processed according to delta encoding techniques prior to transmission to viewer device 106. While aspects are described herein as using an intermediary such as server device 102 to relay virtual environment information, it will be appreciated that, in other examples, virtual environment information may be provided to a viewer device by presenter device 104.

Viewer device 106 may be any of a variety of computing devices, including, but not limited to, a mobile computing device, a desktop computing device, a laptop computing device, or a tablet computing device. Viewer device 106 may communicate with an associated VR headset (e.g., using a wired and/or wireless connection) to provide a rendering of a virtual environment generated by captured environment renderer 122. In some instances, viewer device 106 may further receive user input from the VR headset or other associated peripheral devices. In other examples, viewer device 106 may itself be a VR headset.

As illustrated, viewer device 106 comprises environment capture processor 120 and captured environment renderer 122. Environment capture processor 120 may receive virtual environment information (e.g., as may be generated by environment capture engine 118 and/or relayed via environment relay engine 112). Accordingly, environment capture processor 120 may generate a mesh using the virtual environment information, which may be rendered by captured environment renderer 122 and presented to a user of viewer device 106 accordingly. Environment capture processor 120 may process a depth buffer based on a projection matrix and/or view matrix of the virtual environment information to reverse a projection of the virtual environment (e.g., as may have been performed by virtual environment renderer 116 according to a projection matrix associated with a VR headset of presenter device 104). In examples, environment capture processor 120 may identify configuration information associated with the virtual environment (e.g., based on an identifier indicated by the virtual environment information), which may be used to process the virtual environment accordingly. For example, the configuration information may indicate scaling information associated with the depth buffer.

Environment capture processor 120 may further convert the depth buffer into 3D coordinates and generate a mesh, which may be textured according to a color buffer of the virtual environment information. In other examples, environment capture processor 120 may update an existing mesh (e.g., geometry and/or one or more textures) based on updated virtual environment information. In examples, a mesh may be rendered according to a projection matrix associated with viewer device 106. Thus, the depth buffer generated at presenter device 104 and the rendering presented by captured environment renderer 122 may have different associated projection matrices. As an example, a field of view (FOV) utilized at presenter device 104 may differ from the FOV utilized at viewer device 106, as may be the case when VR headsets having different characteristics are used. As another example, at least one of the FOV at presenter device 104 or the FOV at viewer device 106 may be user-configurable and may be different as a result.

Environment capture processor 120 may process additional information of the virtual environment information. For example, environment capture processor 120 may cause audio data therein to play or, as another example, environment capture processor 120 may present a chat feed and/or a player activity feed as an overlay to the rendered virtual environment. While example processing techniques to process and render a virtual environment at viewer device 106 according to a depth buffer are described herein, it will be appreciated that any of a variety of other techniques may be used in other examples.

As discussed above, a user of viewer device 106 may view multiple virtual environments, such that environment capture processor 120 and captured environment renderer 122 generate a composite virtual environment. In such examples, environment capture processor 120 receives virtual environment information for multiple virtual environments (e.g., as may be received via environment relay engine 112 from multiple environment capture engines). Accordingly, environment capture processor 120 may selectively process received virtual environment information, for example based on which virtual environment the user of viewer device 106 is currently viewing. In other examples, environment capture processor 120 may process virtual environment information to maintain a mesh for a virtual environment even if the user is not currently viewing the virtual environment, such that captured environment renderer 122 may teleport the viewer perspective of the user to the maintained mesh in response to received user input.

Figure 1B:
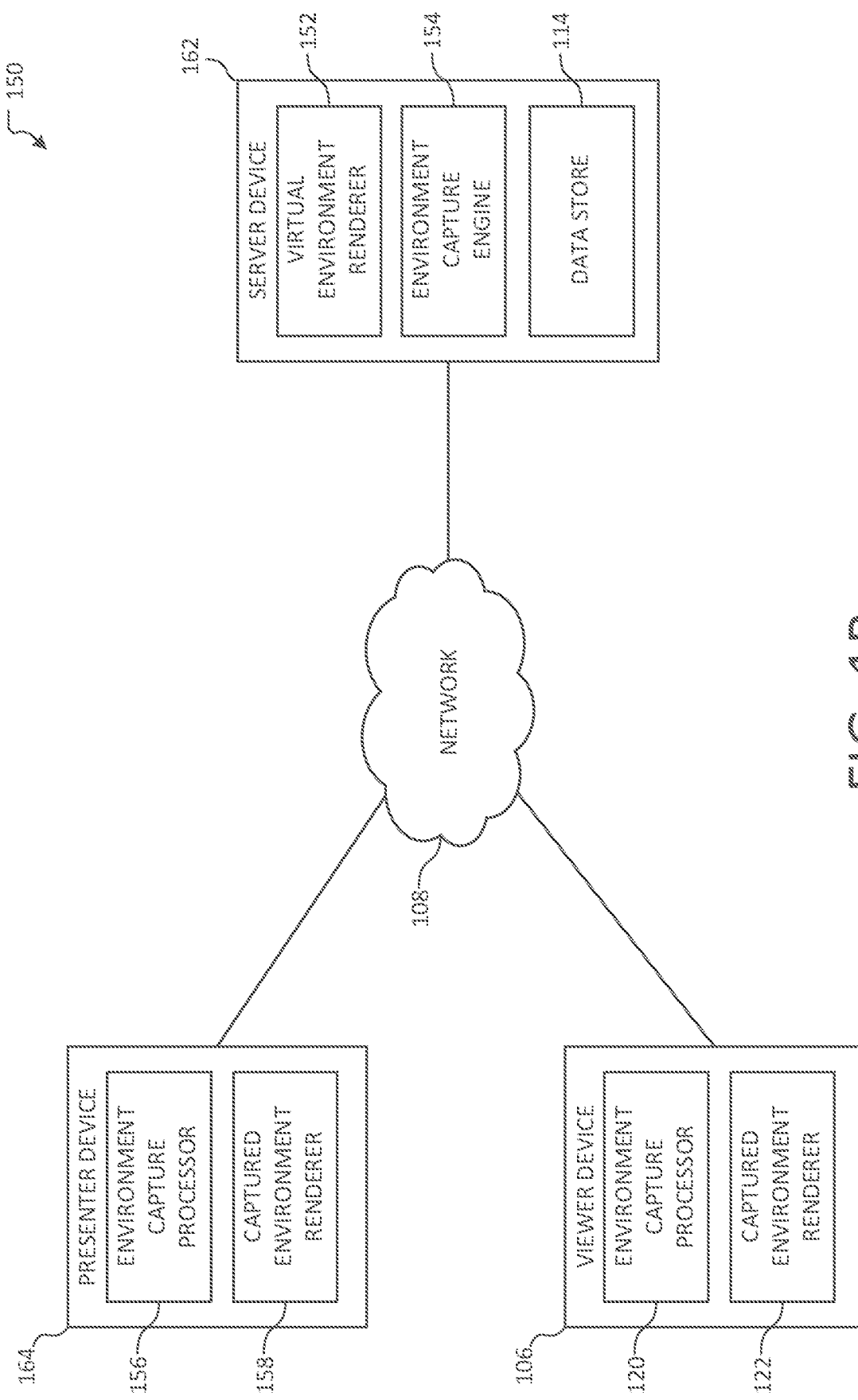
FIG. 1B illustrates an overview of another example system for providing distributed virtual reality according to aspects of the present disclosure.

FIG. 1B illustrates an overview of another example system 150 for providing distributed virtual reality according to aspects of the present disclosure. Aspects of system 150 are similar to those of system 100 discussed above with respect to FIG. 1A and are therefore not necessarily re-described below in detail. As compared to system 100, server device 162 is illustrated as comprising virtual environment renderer 152 and environment capture engine 154, while presenter device 164 is illustrated as comprising environment capture processor 156 and captured environment renderer 158. Thus, the virtual environment information may be generated by server device 162 in system 150, whereas the virtual environment information was generated by presenter device 104 in system 100.

Accordingly, virtual environment renderer 152 may render a virtual environment as described above, such that virtual environment information is captured by environment capture engine 154, which may be transmitted to environment capture processor 156 of presenter device 164. Accordingly, environment capture processor 156 processes the virtual environment information as discussed above with respect to environment capture processor 120. Captured environment renderer 158 ultimately renders the virtual environment for presentation to a user of presenter device 164. In examples, environment capture processor 156 receives user input associated with a perspective of the user in the virtual environment, which may be provided to server device 162 where it is processed by virtual environment renderer 152 accordingly. Thus, a virtual environment need not be rendered local to presenter device 164, but may instead be rendered remotely (e.g., by server device 162) and provided to presenter device 164 for presentation to a user thereof. The virtual environment information may further be provided to viewer device 106, similar to aspects described above with respect to system 100 of FIG. 1A.

Figure 2:
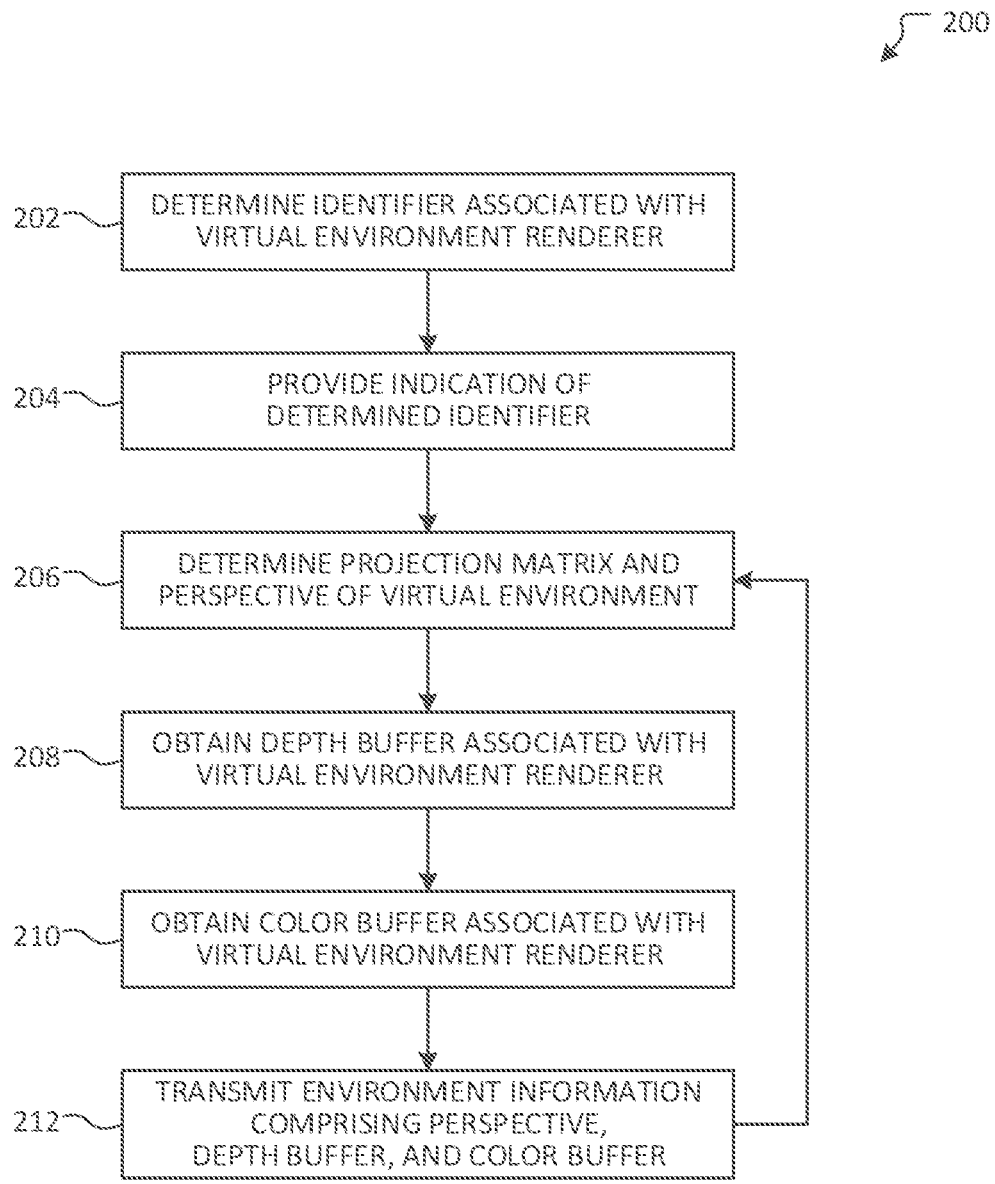
FIG. 2 illustrates an overview of an example method for sharing a virtual environment with a user of another computing device.

FIG. 2 illustrates an overview of an example method 200 for sharing a virtual environment with a user of another computing device (e.g., a viewer of a viewer device, such as viewer device 106 in FIGS. 1A-1B). In examples, aspects of method 200 are performed by a presenter device, such as presenter device 104 in FIG. 1A. In other examples, aspects of method 200 are performed by a server device, such as server device 162 discussed above with respect to FIG. 1B.

Method 200 begins at operation 202, where an identifier is determined for a virtual environment renderer. For example, the virtual environment renderer may be virtual environment renderer 116 or virtual environment renderer 152 in FIGS. 1A and 1B, respectively. For example, the determined identifier may be a video game name, map, and/or game type. The identifier may be determined based on evaluating a set of applications executing on the device or, as another example, may be determined based on a received user indication (e.g., a selection of specific virtual environment to share or a confirmation to begin sharing). In other examples, a virtual environment renderer may implement an API, such that operation 202 comprises executing an API call to request or otherwise obtain an identifier associated with the virtual environment renderer.

Flow progresses to operation 204, where an indication of the determined identifier is provided, for example to a server device (e.g., server device 102 in FIGS. 1A), a presenter device (e.g., presenter device 164 in FIG. 1B) or a viewer device (e.g., viewer device 106). In some examples, the indication may be provided as part of virtual environment information or as part of a virtual environment information update. For example, the identifier may be provided as part of operation 212, such that operation 204 may be omitted in some instances.

At operation 206, a projection matrix and a perspective associated with the virtual environment is determined. For example, the projection matrix may be determined based on a VR headset associated with the virtual environment renderer or, as another example, may be determined from the virtual environment renderer (e.g., based on a graphics library and/or user-configurable aspects of the virtual environment renderer). The perspective may be a view matrix associated with a location and a direction in which the user is looking within the virtual environment.

The view matrix may be determined from the virtual environment renderer (e.g., based on a graphics library and/or user-configurable aspects of the virtual environment renderer). In examples, a change to the view matrix may be detected based on user input (e.g., as may be received at a presenter computing device). For example, movement of a VR headset may be used to determine and identify subsequent changes to the view matrix. As another example, a change to the view matrix may be detected using any of a variety of computer vision techniques. For example, a feature may be identified within a depth and/or color buffer associated with the virtual environment, which may be tracked to identify movement within the virtual environment. Thus, it will be appreciated that any of a variety of techniques may be used to determine a projection matrix and perspective associated with a virtual environment.

Flow progresses to operation 208, where a depth buffer associated with the virtual environment renderer is obtained. For example, a depth buffer associated with the virtual environment renderer may be accessed such that data therein is copied as part of operation 208. As another example, the depth buffer may be received from the virtual environment renderer, from a graphics library, or from a driver or kernel module associated with graphics processing hardware, among other examples. For example, operation 208 may comprise generating an API call, in response to which the depth buffer is received. Thus, it will be appreciated that any of a variety of techniques may be used to obtain a depth buffer associated with the virtual environment renderer.

At operation 210, a color buffer associated with the virtual environment renderer is obtained. For example, a color buffer associated with the virtual environment renderer may be accessed such that data therein is copied as part of operation 210. As another example, the color buffer may be received from the virtual environment renderer, from a graphics library, or from a driver or kernel module associated with graphics processing hardware, among other examples. For example, operation 210 may comprise generating an API call, in response to which the color buffer is received. Thus, it will be appreciated that any of a variety of techniques may be used to obtain a color buffer associated with the virtual environment renderer.

Moving to operation 212, virtual environment information is transmitted. For example, the virtual environment information transmitted at operation 212 may comprise the determined perspective (e.g., the determined view matrix), projection matrix, depth buffer, and/or color buffer. In some instances, at least a part of the virtual environment information may be compressed or otherwise processed for transmission at operation 212. While method 200 is illustrated as obtaining and transmitting various types of virtual environment information, it will be appreciated that, in other examples, any of a variety of additional or alternative virtual environment information may be obtained and transmitted. For example, additional information associated with a virtual environment renderer (e.g., audio, a chat feed, and/or a player activity feed) may be obtained and transmitted according to aspects described herein.

An arrow is illustrated from operation 212 to operation 206 to illustrate that flow may loop between operations 206, 208, 210, and 212 to provide updated virtual environment information (e.g., to a viewer computing device). In such instances, delta encoding techniques may be used for at least some of the updated virtual environment information, where, for example, depth buffer and/or color buffer changes are identified and transmitted in addition to periodic full representations of the depth buffer and/or color buffer. In other examples, operation 212 may comprise transmitting a subset of the determined virtual environment information, as some of the virtual environment information may not have changed between iterations of operations 206, 208, 210, and 212. For example, a projection matrix may remain substantially unchanged for at least a part of method 200. Method 200 may ultimately terminate at operation 212.

Figure 3:
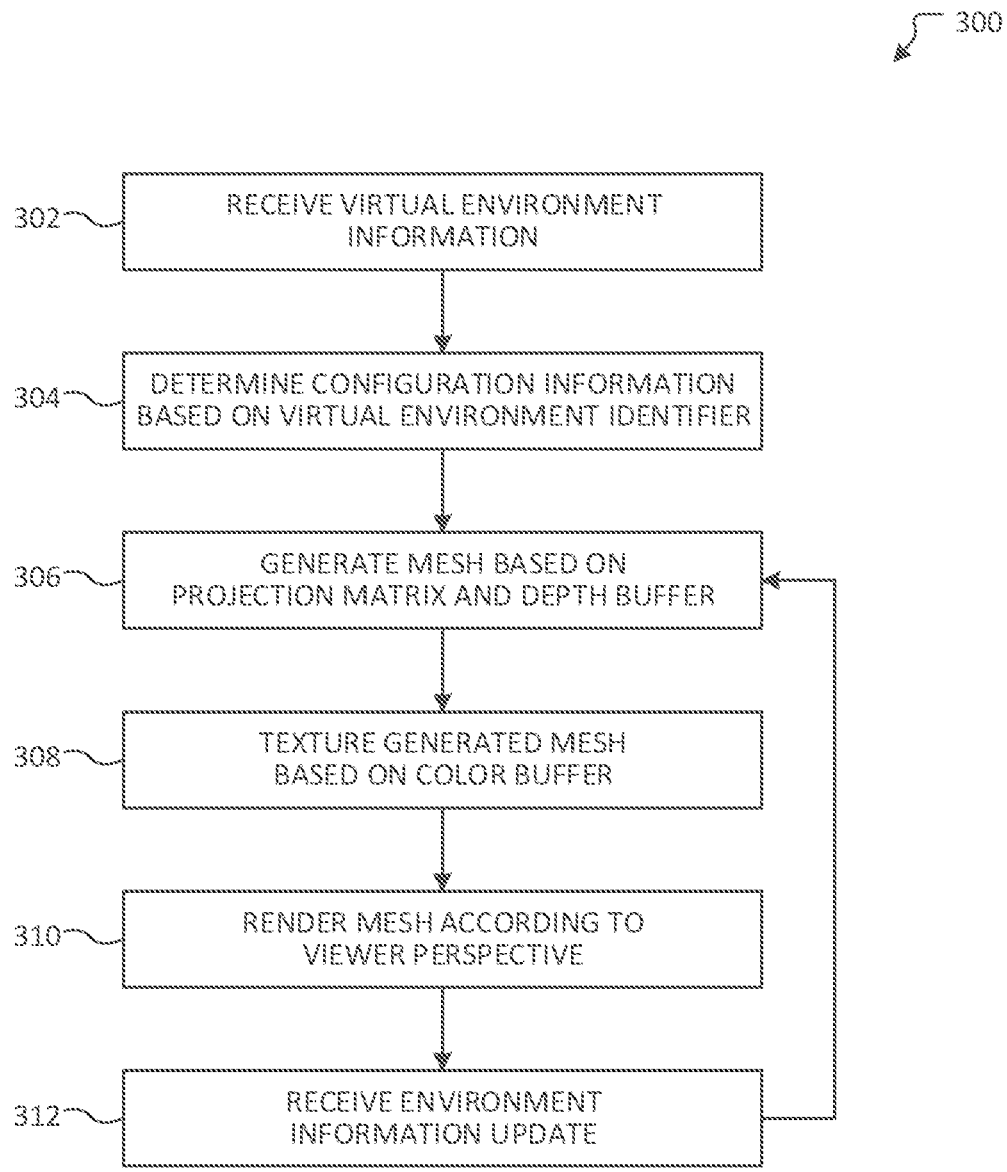
FIG. 3 illustrates an overview of an example method for processing and displaying a virtual environment that is shared by another computing device.

FIG. 3 illustrates an overview of an example method 300 for processing and displaying a virtual environment that is shared by another computing device. For example, the virtual environment may be generated by a viewer device for display to a viewer, such as viewer device 106 of FIGS. 1A and 1B, as may be received from a presenter device or a server device, such as presenter device 104 or server device 102. As another example, aspects of method 300 may be performed by a presenter device in instances where a server device comprises a virtual environment renderer, such as presenter device 164 and server device 162 in FIG. 1B.

As illustrated, method 300 begins at operation 302, where virtual environment information is received. For example, the environment information may be received from a device performing aspects of method 200 discussed above with respect to FIG. 2. For example, the received virtual environment information may comprise a virtual environment identifier (e.g., as may be determined by a device performing aspects of operation 202 in FIG. 2), a view matrix and/or projection matrix (e.g., as may be determined by a device performing aspects of operation 206), a depth buffer (e.g., as may be determined by a device performing aspects of operation 208), and/or a color buffer (e.g., as may be determined by a device performing aspects of operation 210).

Flow progresses to operation 304, where configuration information is determined based on a virtual environment identifier (e.g., as may have been received as part of operation 302). For example, the configuration information may be determined based on an association or mapping between the identifier and the configuration information. For example, a local data store or a remote data store may comprise the configuration information associated with the virtual environment identifier, such that the configuration information may be obtained from the data store accordingly.

At operation 306, a mesh is generated based on the projection matrix, view matrix, and/or the depth buffer. In examples, the projection matrix is used to reverse or otherwise account for projection of the virtual environment (e.g., as may have been performed by a virtual environment renderer according to a projection matrix associated with a VR headset). In examples, aspects of operation 306 are performed according to the configuration information that was determined at operation 304. For example, the configuration information may indicate scaling information associated with the depth buffer, such that a mesh is generated according to the depth buffer based on the scaling information. In other examples, operation 304 may be omitted and such configuration information may be determined based on the received virtual environment information. For example, computer vision techniques maybe used to identify a set of features within a depth and/or color buffer associated with the virtual environment. The set of features may be tracked within the virtual environment to identify 3D movement of the virtual environment (e.g., in the presence of no VR headset movement), such that scaling information may be generated based on the identified movement accordingly.

Flow progresses to operation 308, where the mesh generated at operation 306 is textured according to the color buffer (e.g., as was received as part of the virtual environment information at operation 302). At operation 310, the mesh is rendered according to a viewer perspective. In examples, the viewer perspective may be at least loosely tethered to the presenter perspective, such that the perspective of the viewer moves in relation to the presenter perspective or, as another example, the viewer perspective may be permitted to deviate from the presenter perspective within a predetermined threshold.

For example, the virtual environment may be rendered as described above for each eye of the viewer, thereby enabling a viewer to perceive the virtual environment in 3D. As an example, the mesh may be rendered according to a projection matrix associated with a viewer device (e.g., an associated VR headset). Thus, the depth buffer received at operation 302 and the rendering generated at operation 310 may have different associated projection matrices. As an example, an FOV utilized at a presenter device may differ from the FOV utilized at a viewer device, as may be the case when VR headsets having different characteristics are used. As another example, an FOV may be user-configurable and may therefore be different as a result.

At operation 312, a virtual environment information update is received. For example, the virtual environment information update may be received as a result of a device performing aspects of operations 206, 208, 210, and 212 discussed above with respect to method 200 in FIG. 2. In examples, the virtual environment update may be received periodically (e.g., 25 or 30 times per second) or in response to an event (e.g., a change in the perspective of the presenter or a change in the depth and/or color buffer). As noted above, the virtual environment information update may comprise a subset of the above-described virtual environment information. For example, a projection matrix may be received once or may otherwise be received at a lower frequency than a depth buffer and/or color buffer.

An arrow is illustrated from operation 312 to operation 306 to indicate that operations 306, 308, 310, and 312 may be performed iteratively to update the virtual environment at a viewer device according to virtual environment information received from a presenter device. As noted above, updates (e.g., according to operations 306, 308, and 312) may occur at a lower frequency than the frequency with which the virtual environment is rendered for presentation to the viewer (e.g., according to aspects of operation 310). Thus, the virtual environment may be rendered at operation 310 and user input may be processed to manipulate a viewer perspective therein at a different rate than the rate at which updated virtual environment information is processed.

Figure 4:
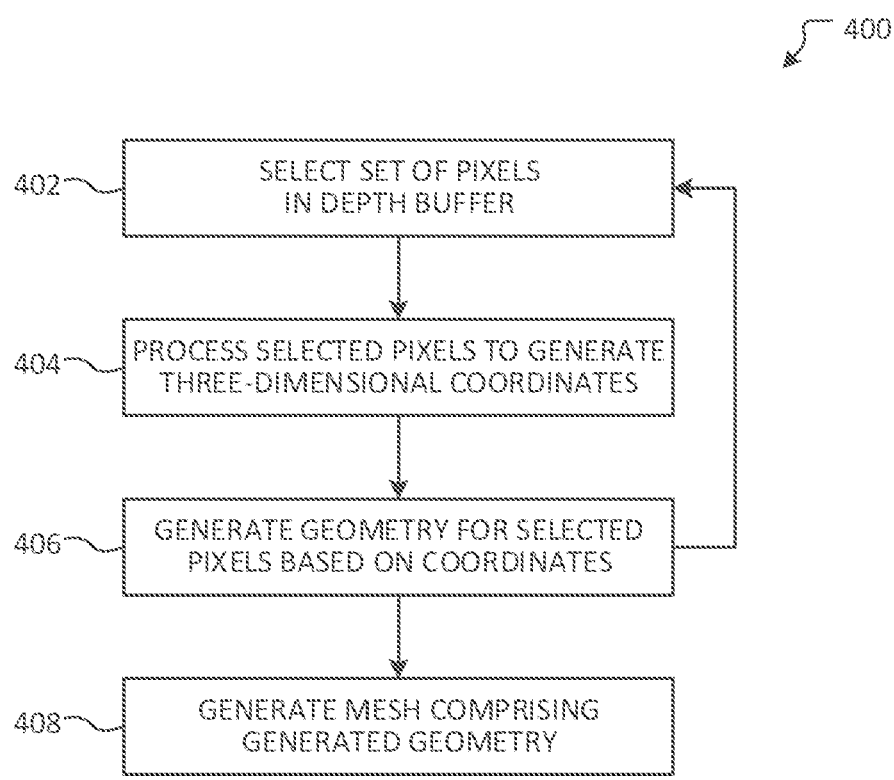
FIG. 4 illustrates an overview of an example method for processing a depth buffer to provide distributed virtual reality according to aspects of the present disclosure.

FIG. 4 illustrates an overview of an example method 400 for processing a depth buffer to provide distributed virtual reality according to aspects of the present disclosure. For example, aspects of method 400 may be performed as part of operation 306 discussed above with respect to method 300 in FIG. 3. It will be appreciated that method 400 is provided as an example of processing a depth buffer and, in other examples, any of a variety of alternative or additional techniques may be used.

Method 400 begins at operation 402, where a set of pixels are selected from a depth buffer. For example, the depth buffer may be received as part of virtual environment (e.g., as may be transmitted by a device performing aspects of operations 208 and 212 of method 200 in FIG. 2 or as may be received by a device performing aspects of operation 302 or operation 312 of method 300 in FIG. 3). In examples, the set of selected pixels comprises pixels associated with a 2×2 grid of the depth buffer. The set of pixels may be selected iteratively, such that subsequent instances of operation 402 yield pixels that have not yet been processed by method 400. In other examples, the set of pixels may be selected based on the virtual environment information. For example, if updated virtual environment information is received according to delta encoding techniques, changed pixels of the depth buffer may be selected at operation 402.

Flow progresses to operation 404, where the selected pixels are used to generate associated three-dimensional coordinates. In examples, a value associated with a pixel of the set of selected pixels is indicative of a coordinate value, such that the pixel may be processed to generate a three-dimensional coordinate value associated with the pixel. In some instances, aspects of operation 404 are performed based at least in part on scaling information associated with a virtual environment, as a similar value may be indicative of a substantially different resulting set of coordinates in some instances. As a further example, a projection matrix and/or view matrix (e.g., as may be received as part of virtual environment information) may be used to reverse a projection of the virtual environment (e.g., as may have been performed when a virtual environment renderer generated the depth buffer).

At operation 406, geometry is generated for the set of pixels according to the coordinates that were generated at operation 404. For example, a 2×2 grid may be used to generate two triangles: an upper triangle and a lower triangle, where each triangle shares two of the four coordinates. In some instances, operation 406 comprises evaluating the generated geometry to identify and address triangles that span relatively large distances (e.g., as may be the case when at least one of the coordinates is associated with an object in the virtual environment that is distinct from another object associated with other coordinates). In other instances, the evaluation may additionally or alternatively comprise evaluating one or more normal vectors associated with the generated geometry to evaluate the degree to which the geometry is oblique (e.g., with respect to the perspective from which the virtual environment was rendered or neighboring geometry). Such evaluations may be performed according to one or more thresholds or ranges, such that a distance or normal vector exceeding a predetermined distance or predetermined angle, respectively, is determined to indicate that the associated geometry should not be included in a mesh generated by method 400. Accordingly, such geometry may be omitted or may be adapted to comply with such predetermined thresholds. While example evaluations and associated thresholds are described, it will be appreciated that any of a variety of techniques may be used.

An arrow is illustrated from operation 406 to operation 402 to illustrate that flow may loop between operations 402, 404, and 406 to process multiple sets of pixels of a depth buffer. For example, flow may loop until all pixels of the depth buffer have been processed. In some instances, operation 406 may determine to omit pixels from resulting geometry (e.g., based on one or more evaluations, as discussed above), such that omitted pixels may be selected for subsequent processing in another iteration of operations 402, 404, and 406.

Eventually, flow arrives at operation 408, where a mesh comprising the geometry generated at operation 406 is generated. For example, the mesh may aggregate triangles generated at operation 406. The generated mesh may subsequently be textured and presented to a viewer according to aspects described herein. While aspects of method 400 are described with respect to triangles, it will be appreciated that any of a variety of other types of geometry may be used. Further, similar techniques may be used to update a mesh (e.g., based on updated virtual environment information), such that aspects of method 400 need not be restricted to generating a new mesh based on a depth buffer. For example, operations 402, 404, and 406 may be performed with respect to changed pixels, such that geometry associated with a previous pixel value may be omitted in favor of new geometry for a new pixel value. Method 400 terminates at operation 408.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
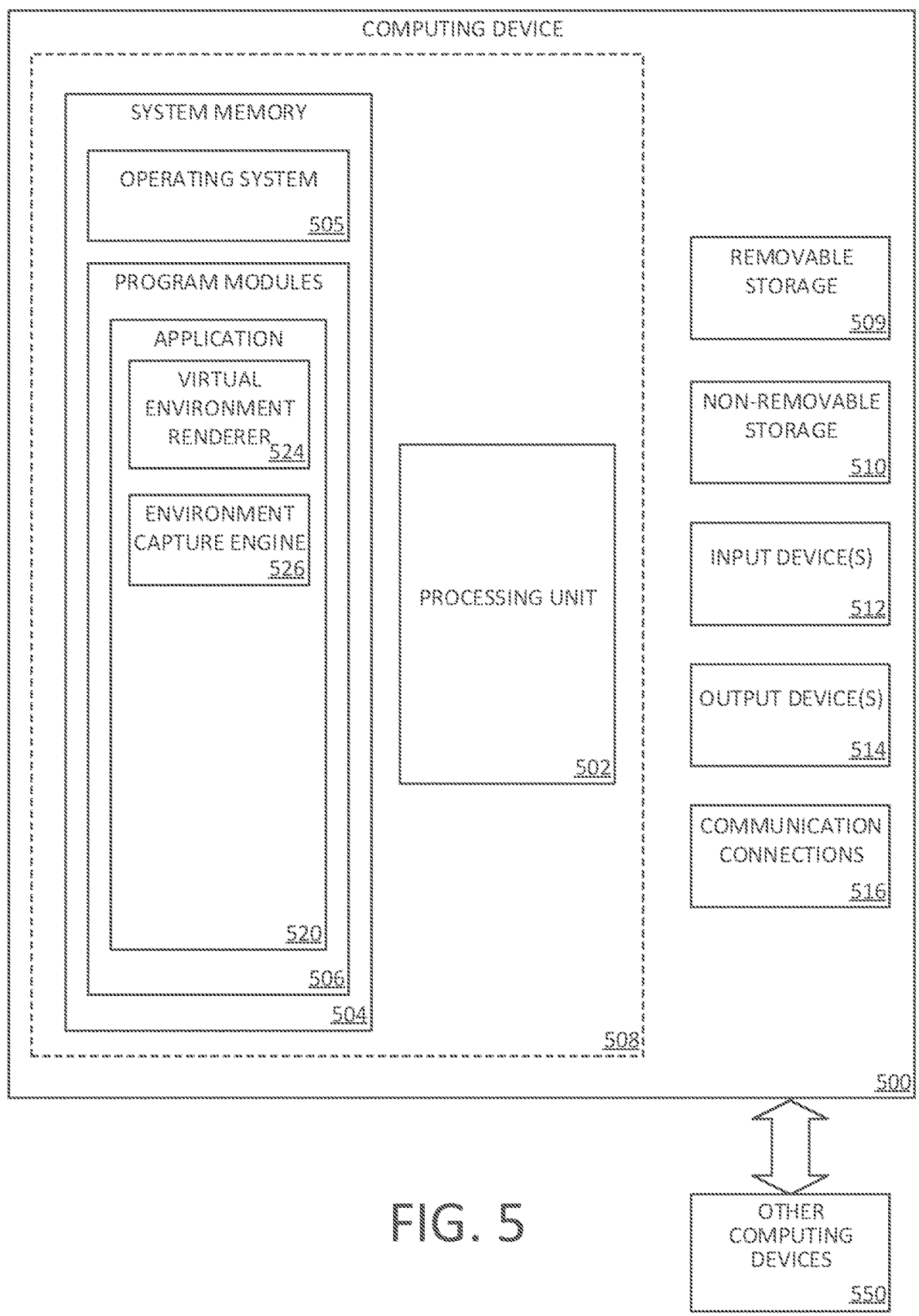
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including devices 102, 104, and 106 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store virtual environment renderer 524 and environment capture engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
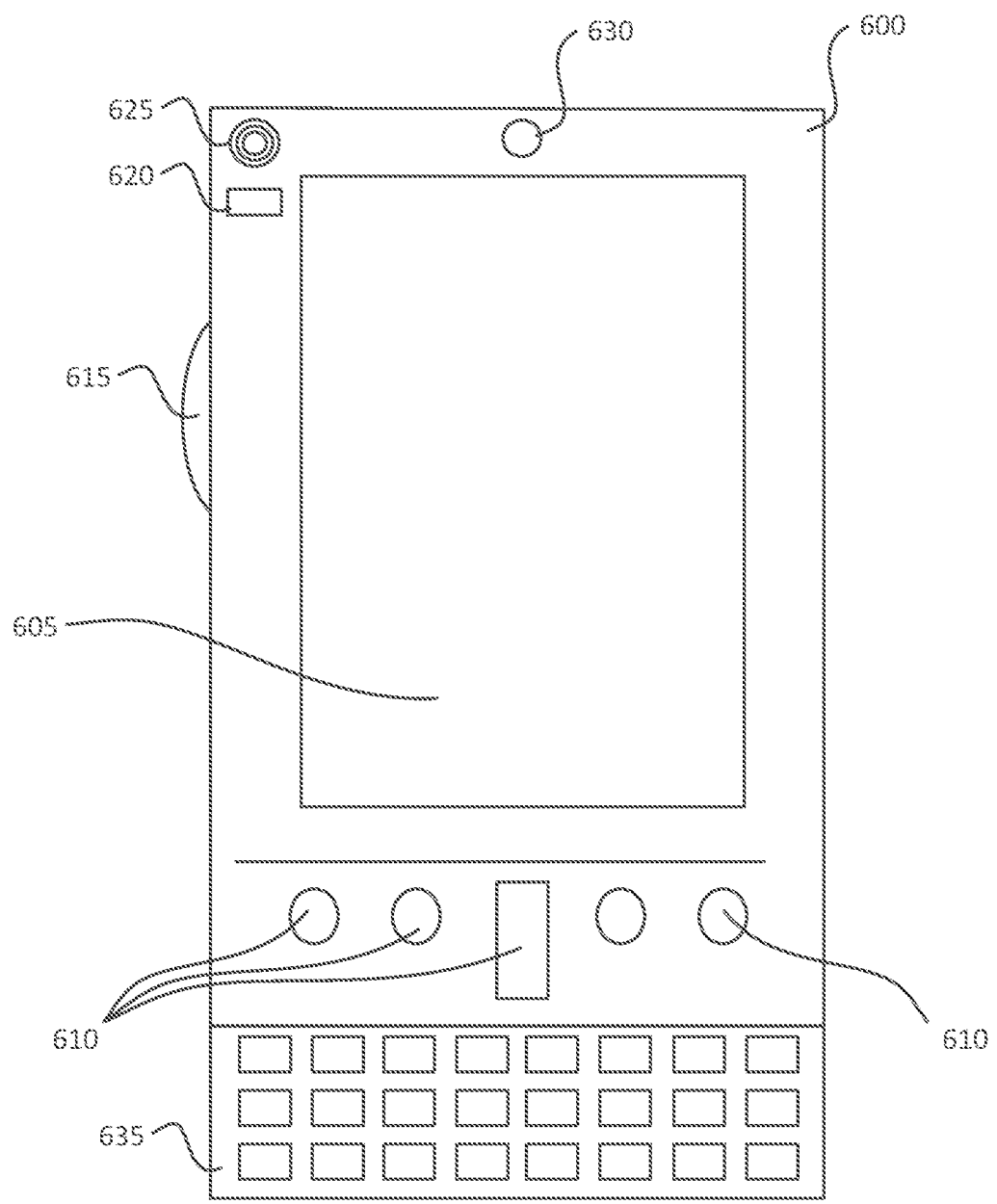
FIGS. 6A and 6B are simplified block diagrams of a mobile computing device with which aspects of the present disclosure may be practiced.
Figure 6B:
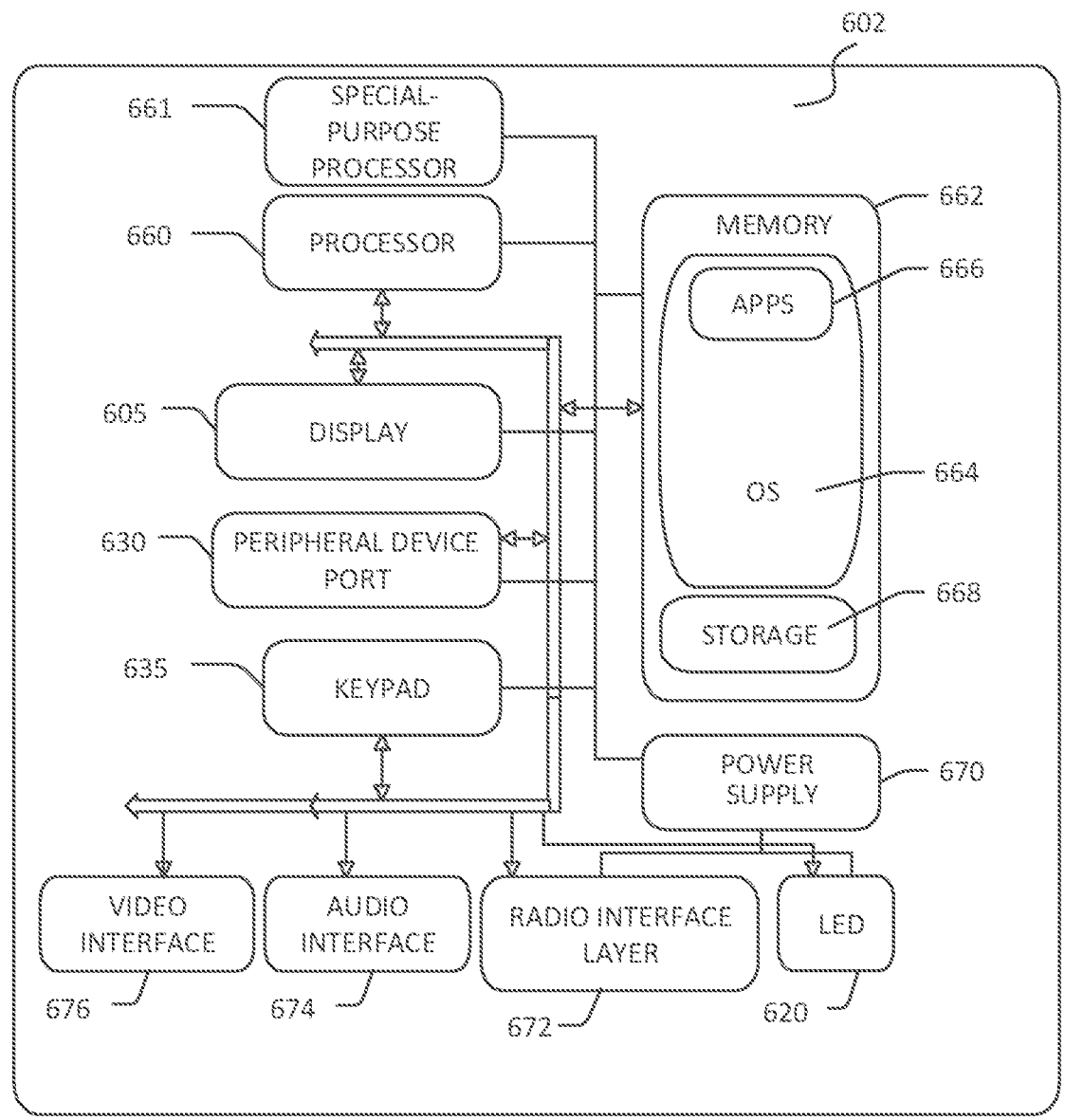

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
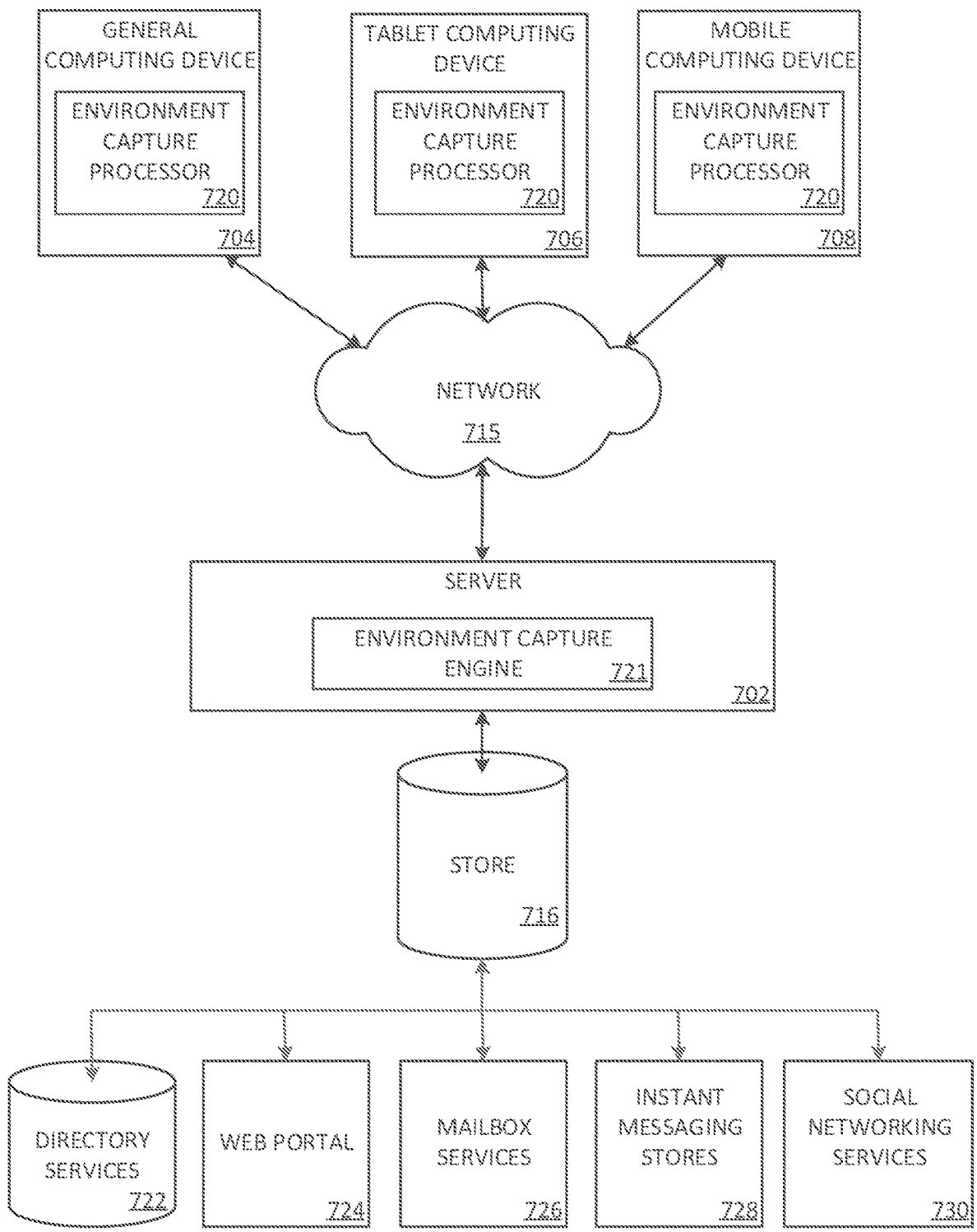
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

An environment capture processor 720 may be employed by a client that communicates with server device 702, and/or environment capture engine 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
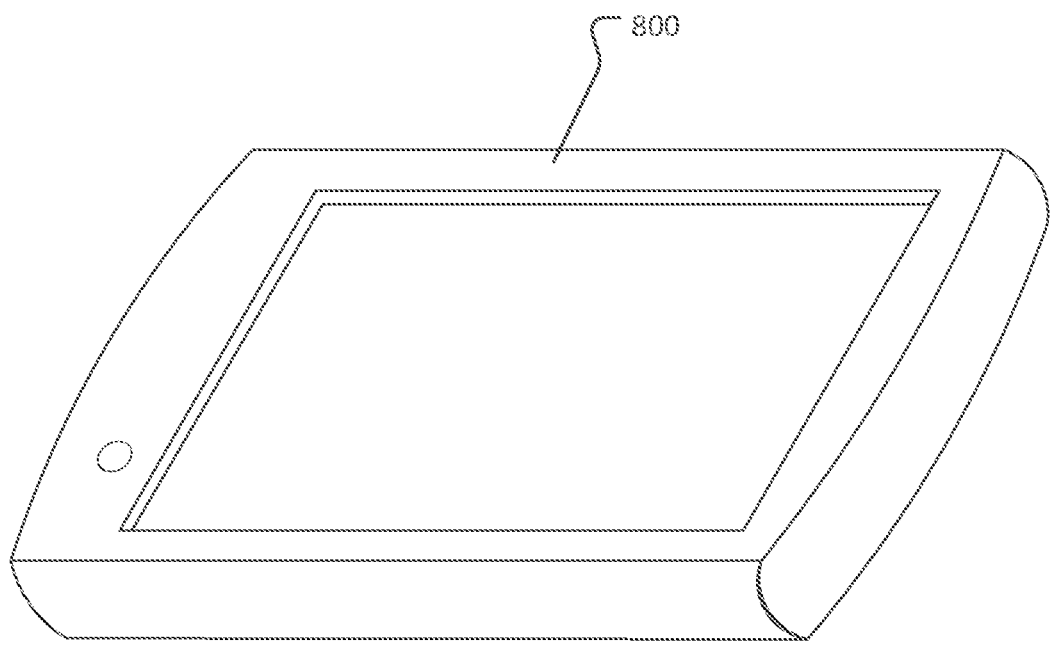
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, from a computing device, virtual environment information associated with a virtual environment, wherein the virtual environment information comprises a depth buffer and a color buffer associated with a presenter perspective in the virtual environment; generating a mesh for the virtual environment based on the depth buffer and the color buffer; and rendering, for display to a user, the generated mesh according to a viewer perspective of the virtual environment. In an example, the set of operations further comprises: receiving updated virtual environment information from the computing device; and rendering an updated mesh according to the updated virtual environment information. In another example, the set of operations further comprises: receiving an indication of user input to change the viewer perspective; and rendering the generated mesh according to the changed viewer perspective. In a further example, the virtual environment information further comprises a projection matrix associated with the computing device; and the mesh is generated based on the projection matrix associated with the computing device. In yet another example, the mesh is generated further based on a projection matrix different from the projection matrix associated with the computing device. In a further still example, the virtual environment information further comprises additional information of at least one of audio, a chat feed, or a player activity feed; and the set of operations further comprises processing the additional information of the virtual environment information to provide the additional information to the user. In another example, the player perspective and the viewer perspective are different; and the depth buffer and the color buffer are of a remote virtual environment renderer of the computing device.

In another aspect, the technology relates to a method for generating virtual environment information. The method comprises: obtaining a depth buffer and a color buffer associated with a virtual environment of a virtual environment renderer, wherein the depth buffer is associated with a presenter perspective; determining a projection matrix associated with the depth buffer; transmitting, to a computing device, the projection matrix, the depth buffer, and the color buffer as virtual environment information associated with the virtual environment; receiving user input to change a presenter perspective; generating updated virtual environment information based on an updated depth buffer associated with the changed presenter perspective; and transmitting, to the computing device, the updated virtual environment information. In an example, the transmitted virtual environment information further comprises additional information obtained from the virtual environment renderer of at least one of a view matrix, audio, a chat feed, or a player activity feed. In another example, the updated virtual environment information is transmitted based on receiving the user input to change the presenter perspective. In a further example, the method further comprises: obtaining additional depth buffer information associated with a perspective other than the presenter perspective; and transmitting, to the computing device, the additional depth buffer information. In yet another example, the projection matrix is associated with at least one of a virtual reality headset or a user-configurable field of view. In a further still example, the user input to change the presenter perspective is received from a presenter computing device.

In a further aspect, the technology relates to a method for generating a virtual environment based on virtual environment information. The method comprises: receiving, from a computing device, virtual environment information associated with a virtual environment, wherein the virtual environment information comprises a depth buffer and a color buffer associated with a presenter perspective in the virtual environment; generating a mesh for the virtual environment based on the depth buffer and the color buffer; and rendering, for display to a user, the generated mesh according to a viewer perspective of the virtual environment. In an example, the method further comprises: receiving updated virtual environment information from the computing device; and rendering an updated mesh according to the updated virtual environment information. In another example, the method further comprises: receiving an indication of user input to change the viewer perspective; and rendering the generated mesh according to the changed viewer perspective. In a further example, the virtual environment information further comprises a projection matrix associated with the computing device; and the mesh is generated based on the projection matrix associated with the computing device. In yet another example, the mesh is generated further based on a projection matrix different from the projection matrix associated with the computing device. In a further still example, the virtual environment information further comprises additional information of at least one of audio, a chat feed, or a player activity feed; and the method further comprises processing the additional information of the virtual environment information to provide the additional information to the user. In another example, the player perspective and the viewer perspective are different; and the depth buffer and the color buffer are of a remote virtual environment renderer of the computing device.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      receiving, from a computing device, virtual environment information associated with a virtual environment rendered by a remote virtual environment renderer of the computing device, wherein the virtual environment information comprises a depth buffer and a color buffer associated with a presenter perspective in the virtual environment, wherein the depth buffer is processed based on at least one of a projection matrix or a view matrix;
      generating a mesh for the virtual environment based on the depth buffer and the color buffer, wherein the mesh is generated based on scaling information of the depth buffer and textured according to the color buffer; and rendering, for display to a user, the generated mesh according to a viewer perspective of the virtual environment.

2. The system of claim 1, wherein the set of operations further comprises:
receiving updated virtual environment information from the computing device, wherein the updated virtual environment information corresponds to a changed presenter perspective of three-dimensional geometry of the virtual environment, wherein the updated virtual environment information comprises at least one of an updated depth buffer or an updated color buffer; and
rendering an updated mesh according to the updated virtual environment information.

3. The system of claim 1, wherein the set of operations further comprises:
receiving an indication of user input to change the viewer perspective; and
rendering the generated mesh according to the changed viewer perspective.

4. The system of claim 1, wherein:
the virtual environment information further comprises a projection matrix associated with the computing device; and
the mesh is generated based on the projection matrix associated with the computing device.

5. The system of claim 4, wherein the mesh is generated further based on a projection matrix different from the projection matrix associated with the computing device.

6. The system of claim 1, wherein:
the virtual environment information further comprises additional information of at least one of audio, a chat feed, or a player activity feed; and
the set of operations further comprises processing the additional information of the virtual environment information to provide the additional information to the user.

7. The system of claim 1, wherein:
the player perspective and the viewer perspective are different; and
the depth buffer and the color buffer are of a remote virtual environment renderer of the computing device.

8. A method for generating virtual environment information, the method comprising:
obtaining a depth buffer and a color buffer associated with a virtual environment of a virtual environment renderer, wherein the virtual environment comprises three-dimensional (3D) geometry that is rendered by the virtual environment renderer and the depth buffer is associated with a presenter perspective;
determining a projection matrix associated with the depth buffer wherein the depth buffer is processed based on at least one of the projection matrix or a view matrix;
transmitting, to a computing device, the projection matrix, the depth buffer, and the color buffer as virtual environment information associated with the virtual environment;
receiving user input to change the presenter perspective;
generating updated virtual environment information based on an updated depth buffer associated with the changed presenter perspective of the 3D geometry of the virtual environment; and
transmitting, to the computing device, the updated virtual environment information.

9. The method of claim 8, wherein the transmitted virtual environment information further comprises additional information obtained from the virtual environment renderer of at least one of a view matrix, audio, a chat feed, or a player activity feed.

10. The method of claim 8, wherein the updated virtual environment information is transmitted based on receiving the user input to change the presenter perspective.

11. The method of claim 8, further comprising:
obtaining additional depth buffer information associated with a perspective other than the presenter perspective; and
transmitting, to the computing device, the additional depth buffer information.

12. The method of claim 8, wherein the projection matrix is associated with at least one of a virtual reality headset or a user-configurable field of view.

13. The method of claim 8, wherein the user input to change the presenter perspective is received from a presenter computing device.

14. A method for generating a virtual environment based on virtual environment information, the method comprising:
receiving, from a computing device, virtual environment information associated with a virtual environment rendered by a remote virtual environment renderer of the computing device, wherein the virtual environment information comprises a depth buffer and a color buffer associated with a presenter perspective in the virtual environment wherein the depth buffer is processed based on at least one of a projection matrix or a view matrix;
generating a mesh for the virtual environment based on the depth buffer and the color buffer wherein the mesh is generated based on scaling information of the depth buffer and textured according to the color buffer; and
rendering, for display to a user, the generated mesh according to a viewer perspective of the virtual environment.

15. The method of claim 14, further comprising:
receiving updated virtual environment information from the computing device, wherein the updated virtual environment information corresponds to a changed presenter perspective of three-dimensional geometry of the virtual environment, wherein the updated virtual environment information comprises at least one of an updated depth buffer or an updated color buffer; and
rendering an updated mesh according to the updated virtual environment information.

16. The method of claim 14, further comprising:
receiving an indication of user input to change the viewer perspective; and
rendering the generated mesh according to the changed viewer perspective.

17. The method of claim 14, wherein:
the virtual environment information further comprises a projection matrix associated with the computing device; and
the mesh is generated based on the projection matrix associated with the computing device.

18. The method of claim 17, wherein the mesh is generated further based on a projection matrix different from the projection matrix associated with the computing device.

19. The method of claim 14, wherein:
the virtual environment information further comprises additional information of at least one of audio, a chat feed, or a player activity feed; and
the method further comprises processing the additional information of the virtual environment information to provide the additional information to the user.

20. The method of claim 14, wherein:
the player perspective and the viewer perspective are different; and
the depth buffer and the color buffer are of a remote virtual environment renderer of the computing device.

* * * * *